United States Patent
Fly et al.

(10) Patent No.: US 11,686,635 B2
(45) Date of Patent: Jun. 27, 2023

(54) MONITORING OF TOOL CALIBRATION STATUS IN AUTOMATED TOOL CONTROL SYSTEMS

(71) Applicant: SNAP-ON INCORPORATED, Kenosha, WI (US)

(72) Inventors: David C. Fly, Maumelle, AR (US); Matthew J. Lipsey, Sherwood, AR (US); Preston C. Phillips, Conway, AR (US); Jason D. Newport, Conway, AR (US); Andrew R. Lobo, Wadsworth, IL (US); Joseph Chwan, Mechanicsburg, PA (US); Frederick J. Rogers, North Little Rock, AR (US); Sean W. Ryan, Pleasant Prairie, WI (US); Thomas L. Kassouf, Port Washington, WI (US)

(73) Assignee: Snap-On Incorporated, Kenosha, WI (US)

(*) Notice: Subject to any disclaimer, the term of this patent is extended or adjusted under 35 U.S.C. 154(b) by 0 days.

(21) Appl. No.: 17/364,607

(22) Filed: Jun. 30, 2021

(65) Prior Publication Data
US 2021/0396613 A1 Dec. 23, 2021

Related U.S. Application Data

(63) Continuation of application No. 16/150,737, filed on Oct. 3, 2018, now Pat. No. 11,085,841.
(Continued)

(51) Int. Cl.
*G01L 5/00* (2006.01)
*B25B 23/142* (2006.01)
(Continued)

(52) U.S. Cl.
CPC .......... *G01L 5/0066* (2013.01); *B25B 13/48* (2013.01); *B25B 23/00* (2013.01); *B25B 23/14* (2013.01);
(Continued)

(58) Field of Classification Search
CPC ..... G01L 5/0066; G01L 25/003; B25B 13/48; B25B 23/00; B25B 23/14; B25B 23/1425;
(Continued)

(56) References Cited

U.S. PATENT DOCUMENTS

| | | | |
|---|---|---|---|
| 2008/0088454 A1 | 4/2008 | Flores | |
| 2010/0170370 A1* | 7/2010 | Yokoyama | B25B 23/14 81/479 |

(Continued)

FOREIGN PATENT DOCUMENTS

| | | |
|---|---|---|
| CN | 104517170 A | 4/2015 |
| CN | 105051763 A | 11/2015 |

(Continued)

OTHER PUBLICATIONS

Indian Patent Office—First Examination Report dated Mar. 11, 2022 in corresponding Indian Application No. 202017015108, 6 pages (English translation).
(Continued)

*Primary Examiner* — Roy Y Yi
*Assistant Examiner* — Geoffrey T Evans
(74) *Attorney, Agent, or Firm* — McDermott Will & Emery LLP

(57) ABSTRACT

A calibration monitoring system is provided to automatically monitor the calibration status of tools and other inventory items, such as upon the items being issued from or returned to the automated calibration monitoring system. The system identifies an inventory item, for example a calibrated torque wrench or other calibrated tool identified
(Continued)

based on a unique identifying tag attached thereto. The system retrieves a calibration parameter value for the item from a calibration database, and completes a calibration measurement of the item based on the calibration parameter value. In the example, a torque measurement of the calibrated torque wrench can thus be automatically completed. In turn, the system determines a current calibration status of the item based on the calibration measurement, and selectively enables or disables issuance of the inventory item from the system according to the item's status as being in calibration or out of calibration.

18 Claims, 8 Drawing Sheets

Related U.S. Application Data

(60) Provisional application No. 62/567,510, filed on Oct. 3, 2017.

(51) Int. Cl.
    *B25B 13/48*     (2006.01)
    *G06Q 10/087*     (2023.01)
    *B25B 23/14*     (2006.01)
    *B25B 23/00*     (2006.01)
    *B25H 3/02*     (2006.01)
    *G06Q 50/04*     (2012.01)

(52) U.S. Cl.
    CPC ......... *B25B 23/1425* (2013.01); *B25H 3/028* (2013.01); *G06Q 10/087* (2013.01); *G06Q 50/04* (2013.01)

(58) Field of Classification Search
    CPC ...... B25H 3/028; G06Q 10/087; G06Q 50/04; Y02P 90/30
    See application file for complete search history.

(56) References Cited

U.S. PATENT DOCUMENTS

2013/0187759 A1     7/2013     Salour et al.
2013/0328661 A1     12/2013     Phillips et al.

FOREIGN PATENT DOCUMENTS

DE     102011001076 A1     9/2012
DE     102011001073 B4     10/2013
TW     201317077 A     5/2013
WO     2012/117032 A1     9/2012
WO     2016/023081 A1     2/2016

OTHER PUBLICATIONS

Taiwan IP Office—Office Action with Search Report dated May 20, 2022 in corresponding Taiwan Application No. 110142174, 4 pages (Search Report only translated into English).
Taiwan Patent Office—Office Action dated Mar. 27, 2020 in corresponding Taiwan Application No. 107134767, 1 page (English translation).
Taiwan Patent Office—Examination Report datd May 25, 2021 in corresponding Taiwan Application No. 107134767, 6 pages (English translation).
European Office Action—Examination Repod dated Sep. 1, 2021 in corresponding European Appln. No. 18786615.7, 5 pgs.
European Searching Authority—Transmittal with International Search Report and Written Opinion dated Jan. 26, 2019 in corresponding International Application No. PCT/US2018/053105, 12 pgs.
WIPO—Transmittal with International Preliminary Report on Patentability dated Apr. 14, 2020 in corresponding International Application No. PCT/US2018/053105, 8 pgs.

\* cited by examiner

MONITORING OF TOOL CALIBRATION STATUS IN AUTOMATED TOOL CONTROL SYSTEMS

CROSS-REFERENCE TO RELATED APPLICATION

This application is a Continuation of U.S. patent application Ser. No. 16/150,737, filed on Oct. 3, 2018, now U.S. Pat. No. 11,085,841, issued on Aug. 10, 2021, which in turn claims the benefit of U.S. Provisional Patent Application No. 62/567,510, filed on Oct. 3, 2017 in the U.S. Patent and Trademark Office, the disclosures of which are incorporated by reference herein in their entirety.

TECHNICAL FIELD

The present subject matter relates to techniques and equipment for monitoring of tool calibration statuses of tools in automated tool control systems.

BACKGROUND

Torque wrenches have long been used in industry to accurately tighten fasteners in assembly, maintenance and repair operations. This is especially true in the aerospace industry, where use of torque wrenches is required and tightly controlled.

In the aerospace and other industries, torque wrenches are required to be calibrated by users on a regular basis. In general, the calibration involves the user performing a torque test of a tool, the user recording of the torque test result in a log to create a record of tool calibration for future reference, and the user determining whether the tool should be used depending on the result of the torque test. The procedures used for tool calibration and recording are generally performed by the user manually, and both calibration and recording is therefore subject to human error. For example, if a torque test result is incorrectly recorded or an incorrect target range is used, a torque wrench having an incorrect calibration value may continue to be used in torqueing and tightening of fasteners despite the tool applying an unknown and potentially incorrect torque load on the fasteners. When this condition is discovered, each fastener joint torqued by the out-of-calibration wrench (e.g., every fastener joint torqued since the wrench's last accurately recorded calibration operation) is suspect and must generally be checked and re-torqued.

A need therefore exists for a system configured to automatically monitor the calibration status of tools and control tool check-in and check-out of such tools from an automated tool control system based on the calibration status.

SUMMARY

The teachings herein alleviate one or more of the above noted problems so as to automatically monitor the calibration status of tools or other inventory objects using an automated calibration monitoring system.

In accordance with one aspect of the disclosure, an automated calibration monitoring system includes a plurality of storage locations configured to store inventory items including a calibrated inventory item, a database, and a processor. The database stores information on inventory items, including the calibrated inventory item, associated with the automated calibration monitoring system and configured for storage in the plurality of storage locations of the automated calibration monitoring system. The database further stores a calibration parameter value for the calibrated inventory item. The processor is configured to, upon the calibrated inventory item being issued from or returned to the automated calibration monitoring system, compare a calibration measurement of the calibrated inventory item with the calibration parameter value for the calibrated inventory item.

The processor may selectively authorize the issue or return of the calibrated inventory item according to a result of the comparison.

The automated calibration monitoring system may further include a calibration measurement device communicatively connected to the processor and configured to perform a calibration measurement of the calibrated inventory item to obtain the calibration measurement. The calibration measurement device may communicate the obtained calibration measurement to the processor.

The calibrated inventory item may be a torque wrench, and the calibration measurement instrument may be a torque tester.

The processor may be further configured to, upon the calibrated inventory item being issued from or returned to the automated calibration monitoring system, transmit a calibration target value for the calibrated inventory item to the calibration measurement device. The processor may receive the obtained calibration measurement from the calibration measurement device after the transmission of the calibration target value.

The calibration parameter value stored in the database may include an acceptable range of calibration parameter values stored in the database, and the processor may selectively authorize the issue or return of the calibrated inventory item when the calibration measurement is within the acceptable range of calibration parameter values.

The automated calibration monitoring system may further include a sensing device configured to sense information used by the processor to determine the presence or absence of inventory items in the plurality of storage locations. The processor may be configured to determine presence of the calibrated inventory item in a storage location of the plurality of storage locations based on the information sensed by the sensing device.

The sensing device may include an image sensor configured to capture images of storage locations of the automated calibration monitoring system, and the processor may be configured to determine presence of the calibrated inventory item by determining whether the calibrated inventory item is present in an image captured by the image sensor.

Each inventory item associated with the automated calibration monitoring system may have a tag uniquely identifying the inventory item, and the processor may be configured to uniquely identify an inventory item present in a storage location of the plurality of storage locations by recognizing the tag uniquely identifying the inventory item in the information sensed by the sensing device.

Each inventory item associated with the automated inventory control system may have a radio frequency identification (RFID) tag uniquely identifying the inventory item, and the automated inventory control system may further include an RFID sensor configured to read RFID tags of inventory items located within the plurality of storage locations.

The database may store records of work orders associated with previous issuances of the calibrated inventory item, and the database may store records of previous calibration measurements of the calibrated inventory item.

The processor may be configured to, upon determining that the compared calibration measurement of the calibrated inventory item is inconsistent with the calibration parameter value for the calibrated inventory item, retrieve from the database all records of work orders associated with the calibrated inventory item and corresponding to issuances of the calibrated inventory item following the last stored record of a previous calibration measurement of the calibrated inventory item.

In accordance with a further aspect of the disclosure, a method for automated monitoring of calibration of inventory items in an automated calibration monitoring system includes identifying, using a sensor of the automated calibration monitoring system configured to sense presence or absence of inventory items, a calibrated inventory item subject to monitoring of calibration. A calibration parameter value for the identified calibrated inventory item is retrieved from a database communicatively connected to the automated calibration monitoring system and storing calibration parameter values for each of a plurality of inventory items. A calibration status of the calibrated identified inventory item is determined based on a comparison of a calibration measurement of the calibrated inventory item with the retrieved calibration parameter value for the calibrated inventory item.

The automated calibration monitoring system may selectively authorize the issue or return of the calibrated inventory item from a storage location of the automated calibration monitoring system according to a result of the determination.

The method may further include, prior to the determining, receiving, from a calibration measurement device communicatively connected to the automated calibration monitoring system and configured to perform a calibration measurement of the calibrated inventory item, the calibration measurement of the calibrated inventory item.

The calibrated inventory item may be a torque wrench, and the calibration measurement instrument may be a torque tester.

The method may further include transmitting a calibration target value for the calibrated inventory item to the calibration measurement device, where the automated calibration monitoring system receives the calibration measurement from the calibration measurement device after the transmission of the calibration target value.

Each inventory item associated with the automated calibration monitoring system may have a tag uniquely identifying the inventory item, and the automated calibration monitoring system may be configured to uniquely identify the calibrated inventory item by recognizing the tag uniquely identifying the calibrated inventory item in information sensed by the sensor.

Each inventory item associated with the automated inventory control system may have a visible tag uniquely identifying the inventory item, and the automated inventory control system may identify the calibrated inventory item by identifying the visible tag of the calibrated inventory item in an image captured by an image sensing device of the automated inventory control system.

Each inventory item associated with the automated inventory control system may have a radio frequency identification (RFID) tag uniquely identifying the inventory item, and the automated inventory control system may identify the calibrated inventory item by reading the RFID tag of the calibrated inventory item.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
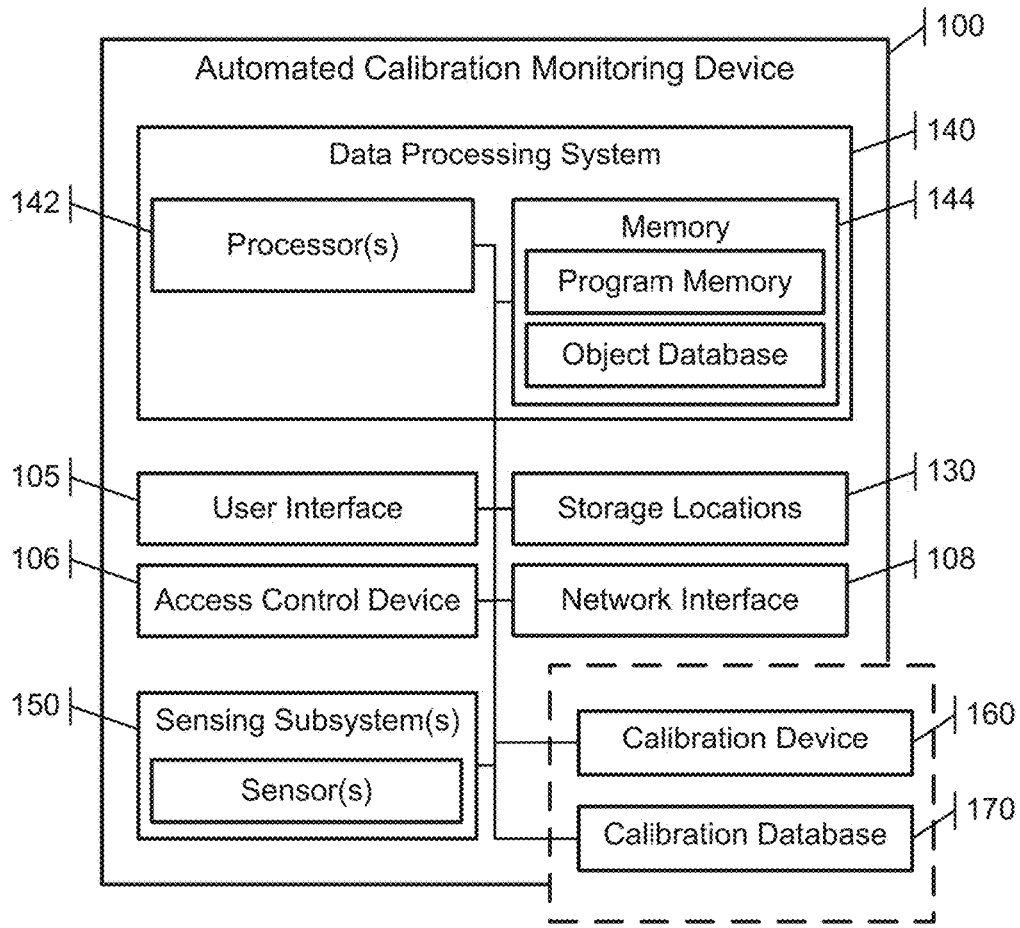
FIG. 1A is a functional block diagram of an automated calibration monitoring device that can support the calibration monitoring services described herein.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to the automated monitoring of tool calibration status in automated tool control systems.

The automated monitoring of tool calibration status is performed using a calibration measurement instrument or device such as an electronic torque tester. The calibration measurement device is communicatively connected with an automated calibration monitoring device, such as an automated inventory control system, which stores calibrated devices such as calibrated torque wrenches and other calibrated tools and monitors the tools issuances/removals from and returns to the system. The calibration measurement device additionally communicates with a calibration database storing calibration values for the tools. The automated calibration monitoring device is configured to uniquely identify tools (and other objects, reference generally as inventory items) stored therein, and to selectively allow issue of individual tools/objects/inventory-items from storage and/or return of the tools/objects into storage based on the result of a calibration measurement such as a torque measurement of the tools/objects. In operation, the calibration measurement device, such as the electronic torque tester, receives a unique identification of a tool/object from the automated calibration monitoring device, retrieves a calibration value for the identified tool/object from the calibration database, and performs a calibration measurement based on the retrieved calibration value. In turn, the automated calibration monitoring device determines whether the calibration measurement is within an acceptable range for the tool/object, and selectively allows issue of the tool/object from the automated calibration monitoring device and/or return of the tool/object to the automated calibration monitoring device based on the result of the determination (e.g., based on determining that the tool/object is accurately calibrated).

In one example, the tool/object is a calibrated torque wrench that is designed to apply a pre-calibrated maximum torque value stored in the calibration database. In the example, the automated calibration monitoring device uniquely identifies the torque wrench on the basis of a tag or identifier applied thereto, and detects that a user has removed the torque wrench from the automated calibration monitoring device. Based on the detection, the automated calibration monitoring device prompts a user to test a current calibration of the torque wrench and, for measurement purposes, communicates the calibration value for the torque wrench to an electronic torque tester. Upon a torque measurement being performed on the torque wrench based on the communicated calibration value, the automated calibration monitoring device determines whether the measurement falls within an acceptable range surrounding the calibration value and allows issue of the torque wrench from the automated calibration monitoring device. However, if the measurement falls outside of the acceptable range surrounding the calibration value, the automated calibration monitoring device alerts the user and instructs the user to return the torque wrench to the automated calibration monitoring device for recalibration.

In general, the tools or other inventory objects stored in the automated calibration monitoring device are individually identifiable by the automated calibration monitoring device. For this purpose, the tools/objects can have tags or other identifiers applied thereto to enable tools/objects that visually appear similar to each other (e.g., two visually identical torque wrenches) to be uniquely/individually identified. The tags or identifiers may encode a tool's serial number or other unique identifier, and enable the calibration status of each tool/object to be individually monitored and recorded in association with the tool/object's unique identifier. The calibration of each tool/object can then be monitored upon each issuance or return of the tool/object from/to the automated calibration monitoring device, and/or on a pre-scheduled basis, on a periodic basis based on a number of issues/returns since a previous calibration measurements, or the like.

Each tool/object's issuance and/or return can further be associated with a work order or job order, and the tool/object's most recently recorded calibration measurement value can be associated with each operation (e.g., tightening of each bolt or fastener) performed as part of the work order or job order. In this way, a record is created for auditing purposes of all operations performed by a tool/object between calibration measurements in case the tool/object is determined to have veered out of calibration during a next calibration measurement operation.

Reference now is made in detail to the examples illustrated in the accompanying drawings and discussed below.

Figure 1B:
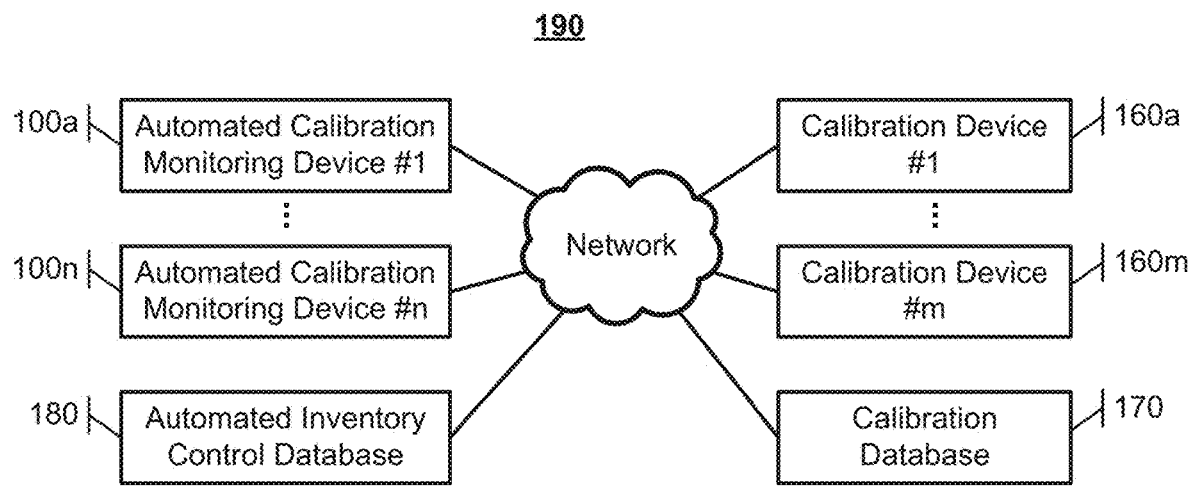
FIG. 1B is a functional block diagram of an automated calibration monitoring system that can support the calibration monitoring services described herein.
Figure 2A:
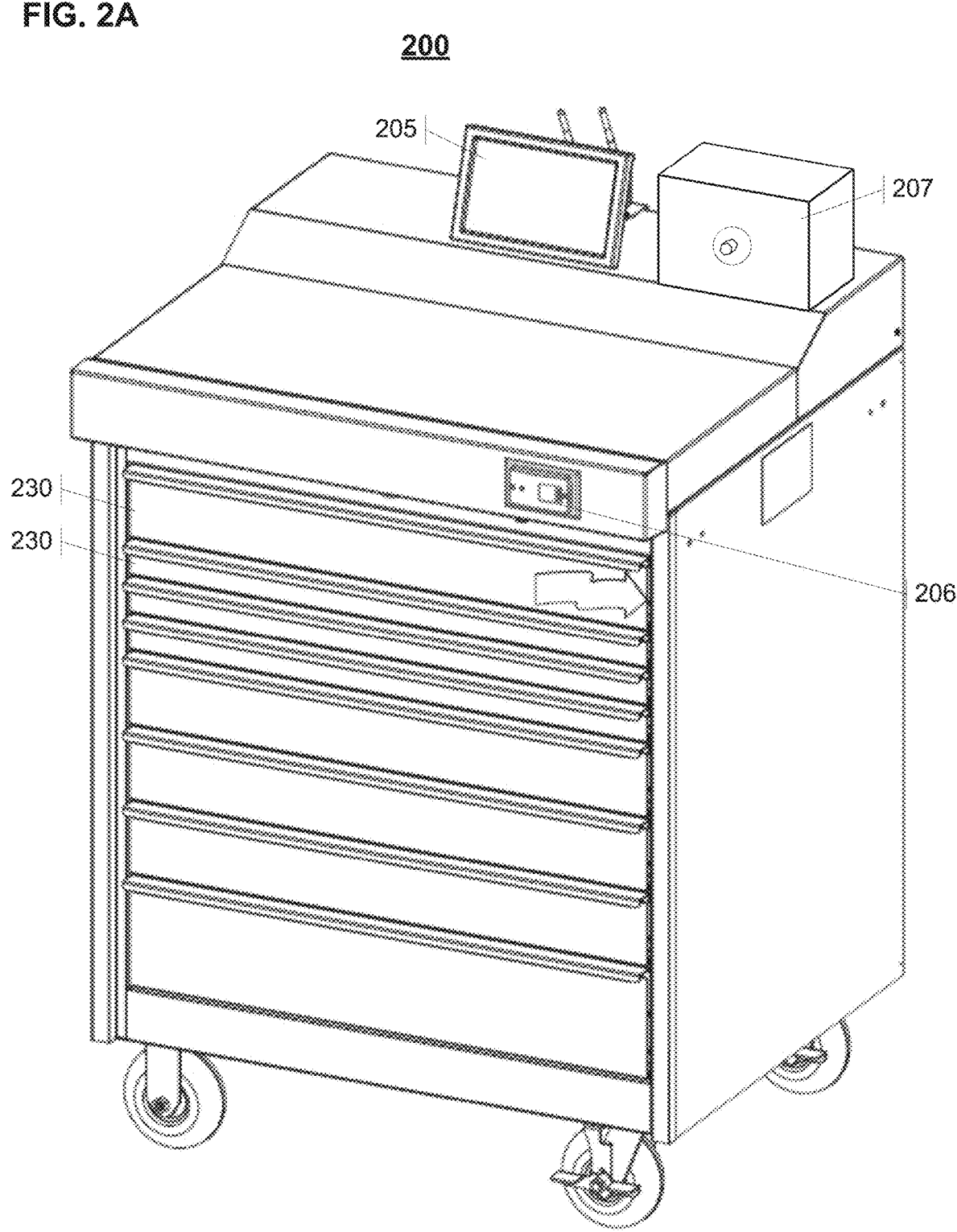
FIG. 2A is a perspective view of an automated tool control system that may support the calibration monitoring services described herein.

FIG. 1A is a block diagram showing components of an automated calibration monitoring device 100, such as the automated tool control system 200 functioning as a calibration monitoring device illustratively shown in FIG. 2A. The automated calibration monitoring device 100 may be used as part of an automated calibration monitoring system 190 such as that shown in the block diagram of FIG. 1B.

As shown in FIG. 1A, the automated calibration monitoring device 100 includes storage locations 130 for storing objects/tools therein, and one or more sensing subsystem(s) 150 for determining the inventory status of objects/tools in the automated calibration monitoring device 100. Additionally, the automated calibration monitoring device 100 can include one or more of a user interface 105, an access control device 106, and a network interface 108. The automated calibration monitoring device 100 can also include a direct wired or wireless communication interface, such as a Bluetooth communication interface for communicating directly with a calibration device 160 or other automated calibration monitoring device.

The storage locations 130 are provided within a body of the automated calibration monitoring device 100 within which tools/objects can be securely stored. The storage locations 130 can include one or more storage drawers (see, e.g., 230 in FIGS. 2A-2C), shelves, cabinet doors, or the like.

The user interface 105 may include one or more user input/output devices, such as a display (e.g., a touch-sensitive display), a keyboard, a mouse or touchpad, a speaker and/or microphone, or the like. The user interface 105 can be used to output information to a user of the device 100 (e.g., via display) and/or receive input and selections from the user (e.g., via a touch-sensitive input device).

The access control device 106 may include one or more of a card reader (e.g., identification card reader), an iris scanner, or the like for receiving identification information from a user seeking access to the device 100. The access control device 106 can also include an alarm used for issuing alerts in response to detecting unauthorized access attempts, and a locking mechanism used to securely lock or block access to the storage locations 130 when no authorized user is logged into the device 100.

The network interface 108 enables the automated calibration monitoring device 100 to communicate across one or more wired or wireless networks with other networked automated calibration monitoring devices (e.g., 100a-100n in FIG. 1B), calibration device(s) (e.g., 160a-160m in FIG. 1B), a calibration database 170, an automated inventory control database (e.g., 180 in FIG. 1B), and/or other components of a networked automated calibration monitoring system 190 (see FIG. 1B) that may be used to monitor the calibration of and inventory statuses of objects/tools across multiple automated calibration monitoring devices 100.

The automated calibration monitoring device 100 is further configured to include or interface with a calibration device 160 (e.g., a calibration measurement device) and a calibration database 170. As shown in dashed lines in FIG. 1A, the calibration device 160 and calibration database 170 can be located within the automated calibration monitoring device 100 and can interface directly with the automated calibration monitoring device 100. Alternatively, the calibration device 160 and calibration database 170 can be located separate from the automated calibration monitoring device 160 and be communicatively connected to the automated calibration monitoring device 100 through a wired or wireless communication link and/or network (see, e.g., FIG. 1B).

As described in further detail below, the calibration device 160 may be used to measure a calibration status of a tool/object. In some examples, the calibration device 160 can take the form of a torque tester or other torque measurement device configured to measure an output torque of a torque wrench. For example, the calibration device 160 may be an electronic torque tester such as a torque tester including a piezoelectric torque transducer mounted in a frame and operative to operative to take torque readings and communicate the torque readings to the automated calibration monitoring device 100. The calibration device 160 optionally includes a display for display of the calibration measurements (e.g., torque readings) to users. In various examples, the torque transducers in a calibration device 160 can be sized for measuring various applied torque loads. Additionally, the calibration device 160 can be communicatively connected to the automated calibration monitoring device 100 or to a network to enable calibration measurement data to be transferred through wired or wireless communication interfaces and links While the foregoing description has detailed an example of a calibrated torque wrench and associated torque tester as a tool/object and calibration device 160 associated therewith, the automated calibration monitoring device 100 can be used with other types of calibrated tools. As one example, the calibrated torque wrench may have an associated torque calibration value and/or angle calibration value for measurement by the calibration device 160. As another example, the calibrated tool may be a torque screwdriver having an associated torque calibration value and/or angle calibration value for measurement by the calibration device 160. As a further example, a precision caliper may be used for precise distance/width/length measurements and may have its calibration measured and monitored using a calibration device 160 such as a precision measurement tool. As another example, a digital multimeter used for electrical measurements may be used for precise voltage, current, and resistance measurements and may have its calibration measured and monitored using a calibration device 160 such as a precision voltage/current/resistance measurer.

The automated calibration monitoring device 100 further includes a data processing system 140, such as a computer, for controlling the functioning of the automated calibration monitoring device 100. For purposes of inventory control, the data processing system 140 processes sensing data received from sensing subsystem(s) 150 and determines inventory conditions of objects/tools and storage locations 130 based on the sensing data. In one example, the data processing system 140 processes images captured by a camera or other image sensing device and/or signals received by RFID sensors. The data processing system 140 includes one or more processors 142 (e.g., micro-processors) and memory 144 (including non-transitory memory, read only memory (ROM), random access memory (RAM), or the like). The memory 144 includes a program memory storing program instructions for causing the automated calibration monitoring device 100 to perform calibration monitoring and inventory control functions such as those described herein. The memory 144 also includes a database of object/tool information, which may include object/tool identifiers, object/tool images, object/tool tag information (e.g., for RFID or bar-code tags), object/tool inventory status and calibration status information, and the like. The program instructions further cause the device 100 to communicate with calibration device(s) 160 to obtain calibration measurements for objects/tools as described in further detail below.

The components of the automated calibration monitoring device 100 of FIG. 1A are communicatively connected with each other, for example via a communication bus or other communication links. The data processing system 140 functions as a central processing unit (CPU) for executing program instructions, such as program instructions stored in a non-transitory machine readable storage medium (e.g., memory 144), for controlling the operation of the automated calibration monitoring device 100. Additionally, the sensing subsystem(s) 150 and calibration device(s) 160 can include microprocessors operative to execute program instructions and perform functions relating to sensing/monitoring/measurement operations.

The automated calibration monitoring device 100 can also be in communication via network interface 108 with wired and/or wireless local area and/or wide area networks (e.g., the Internet). For example, as shown in the automated calibration monitoring system 190 of FIG. 1B, the monitoring system 190 may include multiple automated calibration monitoring devices 100a-100n. Each automated calibration monitoring device (e.g., 100a) may be in communication with one or more other automated calibration monitoring device(s) (e.g., 100n) and/or other elements forming an automated calibration monitoring system 190 such as calibration device(s) 160a-160m, the calibration database 170 (including, e.g., a calibration server storing the calibration database), and an automated inventory control database 180 (including, e.g., an inventory control server storing the inventory control database). In this case, the automated calibration monitoring device 100a may communicate with the other systems and/or servers across the network(s), and may exchange information on calibration measurements, inventory conditions, stored objects/tools, and operation data with those systems and/or servers. The automated calibration monitoring device 100a may alternatively or additionally communicate directly with some of the components of the system 190, for example through direct wired or wireless (e.g., Bluetooth) links with calibration devices 160a-160m or other components.

The networked calibration monitoring system shown in FIG. 1B can use the Windows Communication Foundation (WCF) or similar technology to create a "network service" used to enable communications between devices and databases. Specifically, communications between devices and databases can use a common protocol and information format, such as protocols and formats compatible with WCF, to store and enable easy exchange of inventory, calibration, and other information between devices and servers.

The automated calibration monitoring device 100 can take the form of an automated tool control system 200, such as that shown in FIG. 2A, that provides for the monitoring of tool calibration status (e.g., torque calibration status). The automated tool control system 200 as depicted takes the form of an automated tool control (ATC) toolbox, but may more generally take the form of an ATC locker, an ATC tool crib, or the like. The automated tool control system 200 is connected via a direct wired or direct wireless communication link or via a wired or wireless network to a torque calibration device 207 such as a piezoelectric torque testing/ measurement device functioning as a calibration device 160. The torque calibration device 207 may be mounted on the automated tool control system 200, as illustratively shown in FIG. 2A, or provided separately or remotely therefrom.

While not shown in FIG. 2A, the automated tool control system 200 includes a database (e.g., object database stored in memory 144 and/or calibration database 170 and inventory control database 180) for storage and retrieval of tool related data, including torque tool usage and calibration data. The database may be local to the automated tool control system 200 (see, e.g., FIG. 1A) or communicatively connected thereto through a network interface (see, e.g., FIGS. 1A and 1B).

The automated tool control system 200 is an example of a highly automated inventory control system that utilizes one or more sensing technologies to identify inventory conditions of tools and other objects in the storage unit. The term inventory condition as used throughout this disclosure means information relating to an existence/presence or non-existence/absence condition of objects in the storage system, and/or information on the issuance and return of objects from/to the tool control system 200 and storage locations 130 thereof. In various examples, the inventory conditions are determined using machine imaging, radio frequency (RF) sensing, and/or other sensing methodologies used by the tool control system 200 to identify inventory conditions of objects configured for storage therein.

As shown in each of FIG. 2A, the tool control system 200 includes a user interface 205, an access control device 206, such as a card reader, for verifying identity and authorization levels of a user intending to tool control system 200, and multiple tool storage drawers 230 for storing tools. Instead of drawers 230, the storage system may include shelves, compartments, trays, containers, or other object storage devices from which tools or objects are issued and/or returned, or which contain the storage device from which the objects are issued and/or returned. In further examples, the storage system includes storage hooks, hangers, tool boxes with drawers, lockers, cabinets with shelves and/or doors, safes, boxes, closets, vending machines, barrels, crates, and other material storage means.

User interface 205 is an input and/or output device of tool control system 200, configured to display information to a user including tool calibration and measurement information. Access control device 206 is used to limit or allow access of users to the tool storage drawers 230. Access control device 206, through the use of one or more electronically controlled locking devices or mechanisms, keeps some or all storage drawers 230 locked in a closed position until access control device 206 authenticates and authorizes a user for access to the storage system. The access control device 206 further includes a processor and software to electronically identify a user requesting access to the secure area or object storage device and determine the level of access which should be granted or denied to the identified user. If access control device 206 determines that a user is authorized to access control system 200, it unlocks some or all storage drawers 230, depending on the user's authorization level, allowing the user to remove or replace tools. In particular, the access control device 206 may identify predetermined authorized access levels to the system (e.g., a full access level providing access to all drawers 230, a partial access level providing access only to particular drawer(s) 230, or the like), and allow or deny physical access by the user to the three dimensional space or object storage devices based on those predetermined authorized levels of access. The access control device 206 may also be used to deny a user access to drawers 230 storing tools that are identified as being out of calibration, and/or to deny a user access to stored tools until a tool identified as being out-of-calibration is returned to an appropriate storage location.

Tool control system 200 includes one or more different sensing subsystems. In an illustrative example, the tool storage system 200 includes an image-based sensing subsystem configured to capture images of contents or storage locations of the system using one or more cameras. The image sensing subsystem is further configured to process the images to identify tools/objects present therein or absent therefrom, and to determine inventory conditions based on the processed image data. The image sensing subsystem may include one or more lens-based cameras, CCD cameras, CMOS cameras, video cameras, or other types of devices that captures images.

The tool control system 200 can additionally or alternatively include an RFID sensing subsystem including one or more RFID antennas, RFID transceivers, and RFID processors. The RFID sensing subsystem is configured to emit RF sensing signals through the RFID transceivers and antennas when an RF-based scan of the inventory control system 200 is performed, receive RFID signals sensed by the RFID antennas and transceivers from RFID tags mounted on or incorporated in tools or other inventory items in response to the emitting the RF sensing signals, and process the received RFID signals to identify individual tools or inventory items. Specifically, the received RFID signals may be processed to extract tag identification data included in the returned RFID signals, and to identify individual tools or inventory items located in the tool control system 200 based on an association between tag identification data and tool data stored by the system.

Figure 2B:
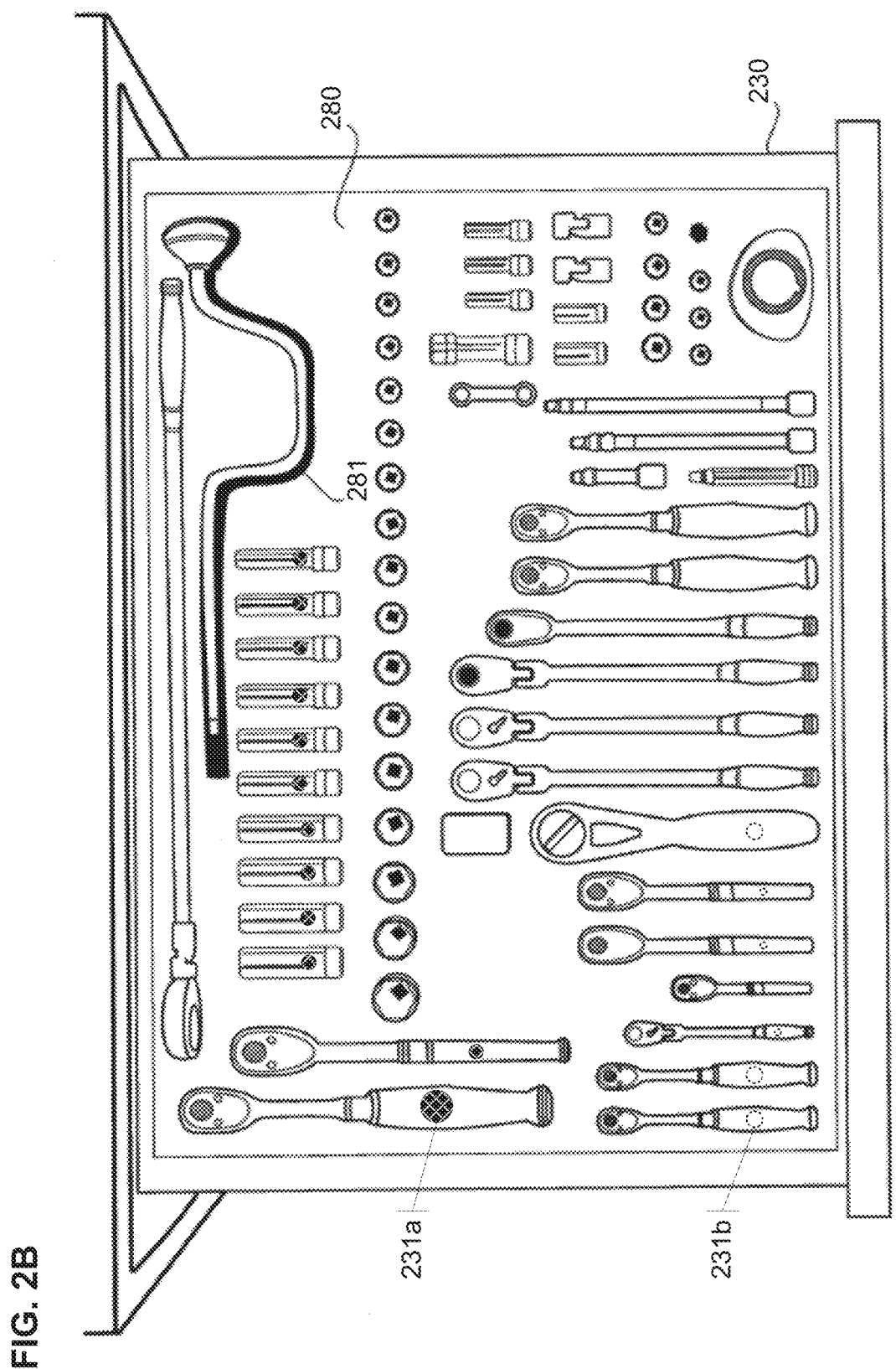
FIG. 2B is a top view of an open drawer of the automated tool control system shown in FIG. 2A.

FIG. 2B shows a detailed view of one illustrative drawer 230 of the control system 200 in an open position. The storage drawer 230 includes a foam base 280 having a plurality of storage locations, such as tool cutouts 281, for storing tools. Each cutout is specifically contoured and shaped for fittingly receiving a tool with a corresponding shape. Tools may be secured in each storage location by using hooks, Velcro, latches, pressure from the foam, etc.

In general, each storage drawer 230 includes multiple storage locations for storing various types of tools. As used throughout this disclosure, a storage location is a location in a storage system for storing or securing objects. In some embodiments, each tool has a specific pre-designated storage location in the tool storage system. In other embodiments, multiple storage locations may have similar (or identical) shapes, and several similarly shaped tools may thus be placed in any of the multiple storage locations.

As shown in FIG. 2B, one or more tools in the drawer 230 may have unique identifiers such as identification tags 231a and 231b mounted or attached thereon or therein. The identification tags may be RFID tags, bar-code tags, or the like. In the case of RFID tags, the RFID tags may be placed on a surface of the tools and may thus be visible to users, such as tag 231a, or the RFID tags may be placed within the tool or may otherwise not be visible to users, such as tag 231b. In general, bar-code tags would be placed on a surface of the tools, such as tag 231a.

Figure 2C:
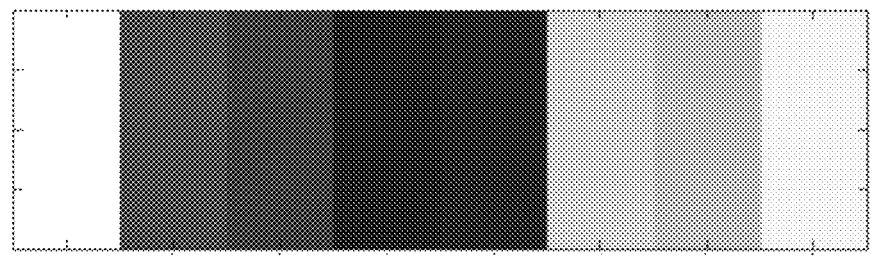
FIGS. 2C, 2D, and 2E show various illustrative tags that can be used to uniquely identify inventory items in the automated tool control system shown in FIG. 2A and other automated calibration monitoring devices.
Figure 2D:
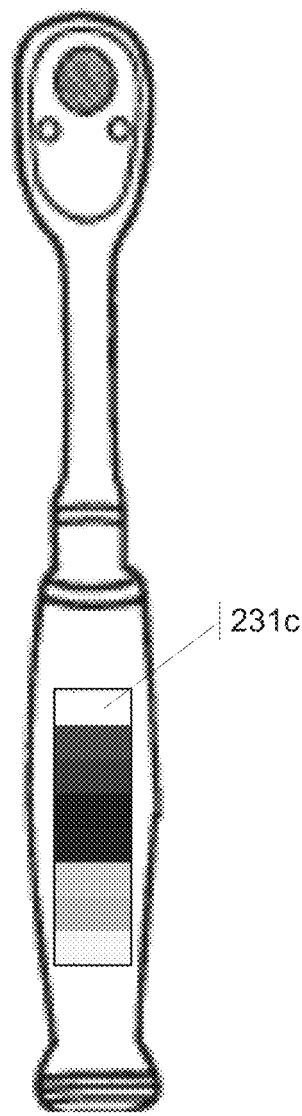
Figure 2E:
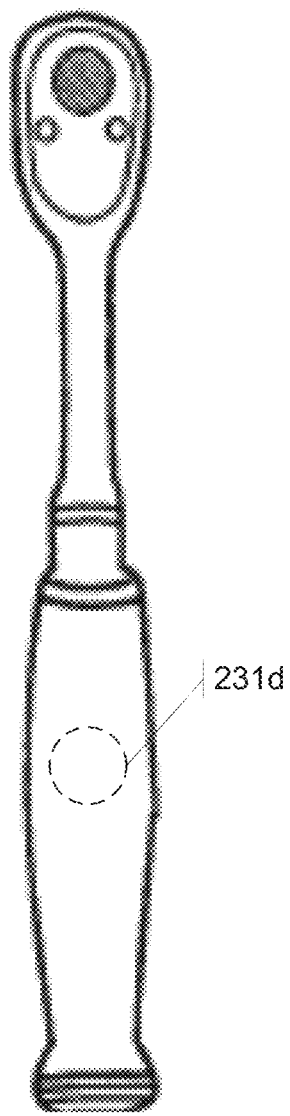

As illustratively shown in FIGS. 2C-2E, the tags placed on tools may be visible and each tag may encode the identifier unique to the tool it is placed on. The visible tags can be placed on the tools so as to be visible to the image sensing system of the tool storage system 200. For example, tags can include a tag 231c having a visible pattern thereon for recognition by an imaging-based sensing subsystem (FIGS. 2C and 2D) or a tag 231*d* disposed on or in a tool and having an RFID-readable (or other wirelessly-readable) code encoded therein (FIG. 2E). Combination tags including both visible and RFID-readable codes may also be used. One or more of the inventory control database 180, calibration database 170, and object database (stored in memory 144) store each tag's unique identifier in association with information on the associated object/tool, such that information on each object/tool can be retrieved from the database(s) based of the tool tag's identifier.

The tags may be formed of a polycarbonate, polyester, or other suitable material, and may have an adhesive backing so as to adhere to the tools they are mounted on. In one example, the information encoded in the tags is encoded using differently colored bands or stripes such as those shown in the illustrative example of FIG. 2C (in which white, purple, red, black, dark blue, light blue, green, and yellow stripes are shown). Both primary colors and/or blended colors may be used. Each color stripe on the tag equates to a number (or alphanumeric character) and the combination of colors creates a code. In the embodiment depicted in FIG. 2C, all stripes have a same length and width; in other embodiments, adjacent stripes may have different lengths and/or widths.

In implementations in which the sensing subsystem 150 includes an RF-based sensing subsystem, the RF sensing subsystem may be configured to sense RFID tags of tools located in all storage locations 130 and storage drawers 230 of system 100/200, or configured to sense RFID tags of tools located in a particular subset of the storage locations 130 or drawers c30 of system 100/200. In one example, the RF sensing subsystem is configured to sense RFID tags of tools located only in the top-most and bottom-most drawers 230 of system 200, and the RF sensing subsystem includes RFID antennas disposed directly above the top-most and bottom-most drawers 230 within system 200 to sense RFID tags of tools located in those drawers. Other configurations of RFID antennas can also be used.

As described above, the automated calibration monitoring device 100 is configured to monitor calibration statuses of storage objects such as tools. Operation of the automated calibration monitoring device 100 will now be described in relation to FIGS. 3A-3E which show simplified flow diagrams outlining operations involved in automatically monitoring the calibration status of inventory objects such as tools.

Figure 3A:
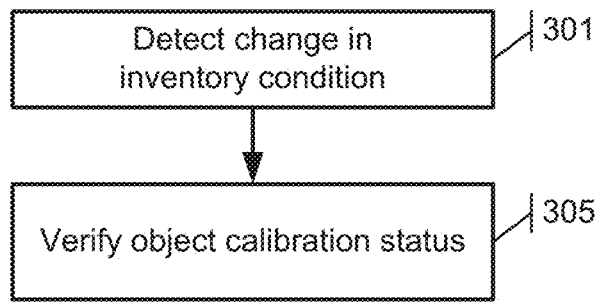
FIGS. 3A-3E show simplified flow diagrams illustrating methods involved in supporting automated calibration monitoring services through automated calibration monitoring devices and/or systems like those shown in FIGS. 1A and 1B.

FIG. 3A shows a simplified flow diagram of a method 300 for automatically monitoring the calibration status of objects/tools. As shown in FIG. 3A, the method includes detecting a change in inventory condition of at least one object/tool in step 301. For instance, the automated calibration monitoring device 100 detects using its sensing subsystem 150 that the inventory status of one or more objects/tools has changed. In one example, the automated calibration monitoring device 100 may detect that an object/tool that was previously stored in a storage location 130 of the device 100 has been removed from or issued from the storage location. In another example, the automated calibration monitoring device 100 may detect that an object/tool that was previously not stored in the device 100 has been placed in or returned to a storage location 130 of the device 100. In a further example, the automated calibration monitoring device 100 may detect that an object/tool has entered a sensing and detection range of the sensing subsystem 150, for instance as a result of the object/tool having been placed within an RF reading range of RF sensors of the sensing subsystem 150. For instance, an RFID sensor located adjacent to the calibration device 160 may detect an object/tool's RFID tag within its sensing range and thereby satisfy step 301.

In response to the detection in step 301, the automated calibration monitoring device 100 proceeds to verify the object calibration status of the object/tool in step 305. The verifying of the calibration status will be described in more detail in relation to FIGS. 3C-3E, below. In general, however, the verification may involve performing a measurement of the calibration of the object/tool using the calibration device 160 and determining whether the measurement is within a calibration range for the object/tool. For instance, the verification may involve performing a torque calibration measurement on a tool such as a calibrated torque wrench using an electronic torque tester, and determining whether the resulting torque measurement is within an acceptable range for the wrench.

Figure 3B:
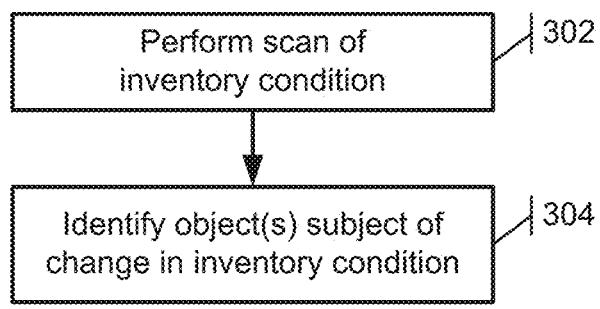

FIG. 3B shows a simplified flow diagram of the method 301 for detecting the change in the inventory condition. Note that the method 301 may be initiated as a result of detecting a change in the inventory condition of a tool/object by the sensing subsystem 150 of the automated calibration monitoring device 100. In general, the change may be detected as part of performing a scan for objects/tools in the automated calibration monitoring device 100 using the sensing subsystem 150 so as to identify objects/tools that may have been issued from or returned to the device 100. The scan may be triggered automatically by the device, for example on a periodic basis. The scan may be triggered by a user, for example in response to the user selecting a calibration option on the user interface 105 of the device 100. The scan may also be triggered in response to detecting that a user has logged into the device 100 (e.g., using the access control device 106), that a drawer 230, door, or lock of the device 100 has been opened or closed (or is being opened or closed), that a scan request has been received via the network interface 108 (e.g., from a central calibration monitoring server), or the like.

As shown in FIG. 3B, the method 301 includes the performing of a scan of the inventory condition of the automated calibration monitoring device 100 using the sensing subsystem 150 in step 302, and processing the sensing signals from the sensing subsystem 150. For example, in the case of an image-based sensing subsystem, one or more images of the storage locations 130 may be captured and processed by the data processing system 140 to identify objects/tools currently located in the storage locations. In the case of an RFID-based sensing subsystem, one or more RF scans of the device 100 may be performed and processed by the data processing system 140 to identify codes of RFID tags currently located within the RF range of the RF sensing antennas.

In turn, the automated calibration monitoring device 100 proceeds in step 304 to identify objects/tools that are subject to a change in inventory condition based on the result of the scan (of step 302) and a previous record of inventory conditions for the device 100. For example, the data processing system 140 may compare a list of objects/tools identified as being present in the device 100 as a result of the scan to a list of objects/tools previously recorded as being present in the device 100 to identify any objects/tools subject to a change in inventory status. Step 304 may result in the device 100 identifying one or more objects that are subject to a change in inventory condition, such as one or more objects that are determined to have been returned to the device 100, issued from the device 100.

In response to the identification of object(s) in step 304, the automated calibration monitoring device 100 proceeds to verify the object calibration status of the object/tool in step 305 as described in more detail below in relation to FIGS. 3C-3E.

Figure 3C:
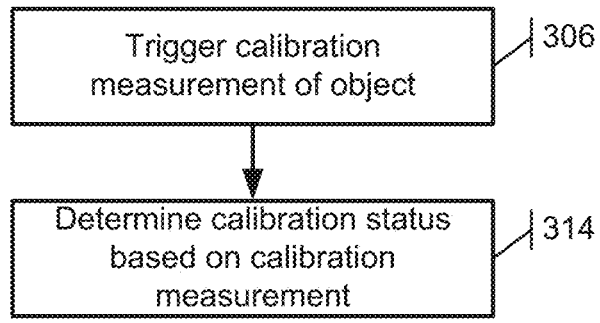

FIG. 3C shows a simplified flow diagram of the method 305 for verifying the calibration status of the identified object. The method can include the automated calibration monitoring device 100 triggering in step 306 the taking of a calibration measurement of the object(s) identified in step 304 and, based on the result of the calibration measurement, determining an up-to-date calibration status of each object in step 314. Steps 306 and 314 are described in further detail in relation to FIGS. 3D and 3E, below. Note that in cases in which multiple objects/tools are identified in step 304, step 305 may be repeated for each identified object/tool.

Figure 3D:
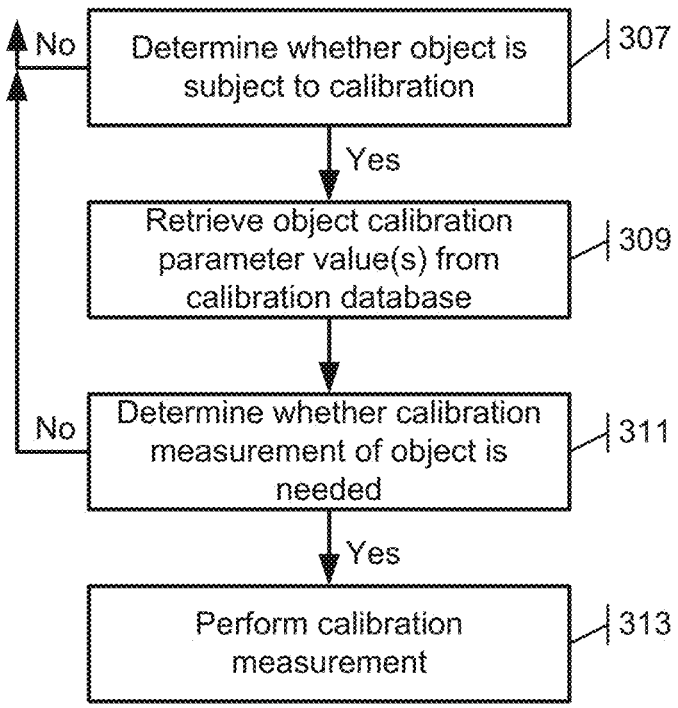

FIG. 3D shows a simplified flow diagram of the method 306 for triggering the taking of a calibration measurement. In accordance with the method 306, the automated calibration monitoring device 100 determines in step 307 whether the object identified in step 304 is a calibrated object that is subject to calibration. To make the determination, the automated calibration monitoring device 100 may consult the database of object information stored in memory 144 and determine whether the object is identified as a calibrated object therein. Additionally or alternatively, the automated calibration monitoring device 100 may consult the calibration database 170 or the inventory control database 180 to determine whether the object is identified therein as a calibrated object. If the object is not subject to calibration, then control is returned to step 301. Alternatively, in cases in which multiple objects are identified in step 304, control is returned to step 305 to trigger calibration measurement of a next identified object.

In cases in which the object is identified as being subject to calibration, the automated calibration monitoring device 100 proceeds to step 309 in which at least one calibration parameter value(s) for the identified object is retrieved from the calibration database 170. The calibration parameter value(s) for the identified object typically includes a calibration target value and a calibration range of acceptable calibration values. The calibration parameter value(s) can additionally include information on the last calibration performed on the object, such as a time of the last calibration, an elapsed time since the last calibration, a number of issuances and/or returns since the last calibration, a number of operations since the last calibration, or the like.

In step 311, the automated calibration monitoring device 100 optionally determines whether a calibration measurement of the object is needed and, in cases in which calibration is determined not to be needed, control is returned to step 301, or to step 305 in cases in which multiple objects are identified in step 304. In general, the automated calibration monitoring device 100 will by default determine that a calibration measurement is needed in step 311 such that control will proceed to step 313. However, the automated calibration monitoring device 100 may determine that a calibration measurement is not needed in cases in which a calibration measurement was recently performed on the object and/or in cases in which the object was identified as being out of calibration based on a previous measurement. The device 100 determines that a calibration was recently performed based on the time of the last calibration (e.g., if the last calibration measurement was performed less than a predetermined threshold time t prior to the current time, such as less than 1 hour, 1 day, or 1 week prior to the current time), an elapsed time since the last calibration (e.g., if the elapsed time is less than the predetermined threshold time), a number of issuances and/or returns since the last calibration (e.g., if the number of issuances since the last calibration is less than a predetermined threshold number, such as less than 2 issuances), a number of operations since the last calibration (e.g., if the number of operations involving the object since the last calibration is less than a predetermined threshold number, such as less than 10 fastening operations), or the like.

In step 313, the calibration measurement of the object is performed. The measurement of calibration can include the automated calibration monitoring device 100 providing instructions to a user via the user interface 105 to perform the calibration measurement. The measurement can further include the device 100 providing the calibration device 160 with the calibration target value for the object in order to enable the calibration device 160 to perform the measurement on the basis of the target value. In response to performing the measurement, the calibration device 160 returns to the device 100 a calibration measurement value corresponding to the measured calibration of the object.

Figure 3E:
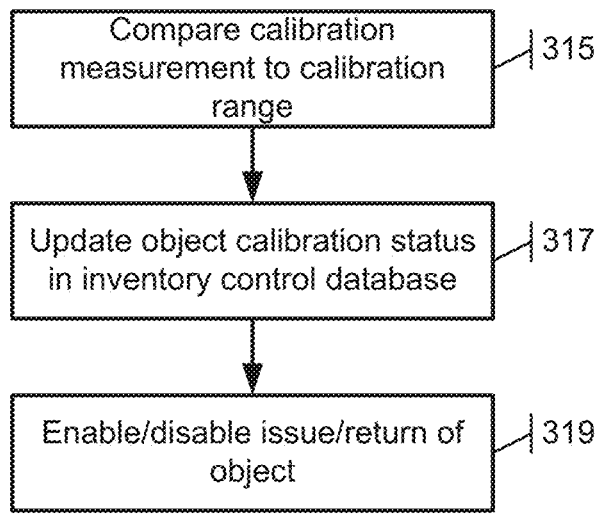

FIG. 3E shows a simplified flow diagram of the method 314 for determining the calibration status of the object. In accordance with method 314, the automated calibration monitoring device 100 receives the calibration measurement value for the object as obtained in step 313 from the calibration device 160. The device 100 proceeds in step 315 to compare the calibration measurement value to the calibration range of acceptable values to determine whether the measurement value falls within the range of acceptable values for the object. If the calibration measurement value falls within the calibration range of acceptable values, the device 100 determines that the object is in calibration; alternatively, if the calibration measurement value falls outside of the calibration range of acceptable values, the device 100 determines that the object is out of calibration.

The device proceeds in step 317 to update the calibration status (in calibration, or out of calibration) for the object in the calibration database 170 and/or the inventory control database (e.g., 180, or stored in memory 144). The calibration database 170 may additionally be updated to store the calibration measurement value and other data relating to the calibration measurement of step 313 (e.g., date/time of calibration measurement, calibration target value used, identity of the calibration device 160 used for measurement, etc.).

In turn, the automated calibration monitoring device 100 can enable or disable the issue and/or return of objects/tools based on the updated object calibration status in step 319. For example, upon determining that the object/tool is in calibration, the automated calibration monitoring device 100 may enable or authorize issue and/or return of the object/tool from/to the storage locations of the device 100. Alternatively, upon determining that the object/tool is out of calibration, the automated calibration monitoring device 100 may disable or block issue of the object/tool from the device 100 and may request that the object/tool be promptly returned to the device 100.

The foregoing discussion has focused on situations in which one or more calibrated objects/tools (e.g., a torque tool such as a torque wrench) are issued. The system can handle situations in which a single object/tool is issued by assuming the single issued tool is the only tool available for calibration measurement and by associating all calibration measurement related data and results received from the calibration device 160 pertain to the single object/tool being issued or returned.

In cases in which multiple objects/tools are being issued or returned at the same time, there are various options which can be presented by the system. One option is to provide the user with a choice. The system displays via the user interface 105 a list of calibrated objects/tools being issued or returned and the user selects one for the current calibration measurement and proceeds to perform the calibration measurement on the selected object/tool. Once the calibration measurement of the selected object/tool is completed, the object/tool disappears from the display screen and the user is given the opportunity to select a next object/tool for calibration.

An alternative provides for the system to select which object/tool is to be subject to calibration measurement and to display system-selected object/tool's data on the display screen. The user is then charged with providing the selected object/tool to the calibration device 160 for the calibration measurement. After this tool is tested, a next object/tool is selected by the system and identification for the next object/tool is displayed. The process is repeated until all objects/tools being issued and returned are subject to calibration measurement.

A further alternative provides a sensing subsystem 150 on or adjacent to the calibration device 160 to enable the calibration device (e.g., a torque testing device) to directly sense and identify the unique identifier attached to an object/tool provided therein for calibration. For example, an RFID sensor provided adjacent to the calibration device 160 and having a short RFID reading range (e.g., up to 20 centimeters in front of the calibration device 160) may be used to automatically identify objects/tools with RFID tags that are located in close proximity to the calibration device 160. The calibration device 160 can then report measured calibration values together with the identity of the object/tool detected in its close proximity to the automated calibration monitoring system.

A purpose of the systems and methods disclosed herein is to provide an efficient process for enabling the automated monitoring of tool calibration using, e.g., an automated tool control system in concert with a calibration device such as torque testing device. As detailed, a number of efficiencies and advanced functionalities are enabled through the combined use of the devices executing advanced functions enabled by software programming executed on system processors.

The systems and method described above make use of databases storing calibration data for objects/tools. The calibration monitoring system 190 can include individual data stores or databases in individual calibration monitoring devices 100a-100n and/or one or more centralized master databases residing in one or more central servers. In general, calibration related data for each of the calibrated objects, tools, and other inventory items are pre-stored in the calibration database 170 and/or preloaded into the memory 144 of an automated calibration monitoring device 100 for use in calibration status monitoring as described above.

In general, the calibration data for tools stored in the calibration database 170 includes one or more of the data entries shown in Table 1 below:

In more detail, the calibration database 170 can store the following data for each calibration tool/object:
a) a device identifier code, such as a unique tool ID and/or the code included on a tag attached to the object/tool;
b) a description of the object/tool;
c) a calibration target value for the object/tool, corresponding to the calibration value to which the object/tool should be calibrated. The calibration target value can be provided as a single target value or as a target calibration profile including a plurality of target values each associated with applied test criteria (e.g., a different applied load, such as 40, 80, 120, 160 and 200 N*m). When a target calibration profile is used, the calibration measurement includes measuring the object/tool's calibration as each of the test criteria are sequentially applied thereto and reporting of the measurement obtained for each test criteria;
d) a calibration target acceptable range, corresponding to a range of calibration values within which the object/tool is considered to be in calibration. The target acceptable range can be expressed as a range of calibration values and/or as a percentage of deviation from the calibration target value (e.g., +/−0.5%);
e) one or more previous calibration measurement values, corresponding to the last recorded calibration measurement value/level and, optionally, additional previous recorded calibration measurement values/levels;
f) timestamp(s) (e.g., date(s) and time(s)) of each of the one or more previous calibration measurement values;
g) optionally, calibration device identity (e.g., transducer ID and, optionally, capacity rating) of the calibration device 160 used for each of the one or more previous calibration measurement values;
h) when appropriate, the database can also store: (i) units of measurement for each calibration target value, range, and previous calibration measurement), (ii) a deflection or angular displacement (e.g., for each previous calibration measurement, a deflection or an angular measurement of the displacement reached during the calibration test) or a measure of calibration curve fit, (iii) air pressure and/or temperature (e.g., for each previous calibration measurement), or the like.

In addition, the calibration database 170 can store additional calibration data including an object/tool calibration interval or schedule (e.g., indicating a maximum interval between calibrations of the instruction), that can include a next calibration due date (e.g., calculated based on the object calibration schedule and the date of the last calibration measurement) which may be recorded by date or by time interval (e.g., measured in minutes, hours, days, weeks, or the like), by number of uses, by number of days, or the like. The calibration interval or schedule, when stored, may be specific to each tool/object such that a different schedule is stored for each tool; specific to a category of tool/object such that a same schedule is stored for each tool category while different schedules are stored for different tool categories; or the same for all tools/objects.

| Object/Tool ID | Object/Tool Description | Calibration Target Value | Calibration Acceptable Range | Last Calibration Measurement Value | Last Calibration Timestamp |
|---|---|---|---|---|---|
| X450-400 | ATECH3F250 Torque Wrench | 100 ft-lb | 98-102 ft-lb | 100 ft-lb | 9/20/2017 12:00:00 GMT |
| . . . | . . . | . . . | . . . | . . . | . . . |

The calibration database 170 can store further calibration data including object calibration data, including maximum and/or minimum acceptable torque level ranges at various loads, and/or maximum and/or minimum acceptable torque angular displacement ranges at various loads (e.g., in the case the tools/objects are calibrated torque wrenches).

The calibration database 170 can store further calibration data including process data, which may include (a) calibration and test process data per ISO 6789-2:2017; (b) conformance tests to ISO 6789-1:2017; (c) uncertainty tests to ISO 6789-2:2017; (d) 20%, 60%, 100% max torque values for each tool/object; (e) number of test points required; (f) a target torque value; and/or (g) upper and lower limits.

One of the calibration database 170, the inventory control database 180, and/or the memory 144 of the automated calibration monitoring device 100 may additionally store data associated with each object/tool including data identifying the object/tool (such as a part number, a description, or other a unique identifier), a storage location for the object/tool within the device 100, a manufacturer or supplier, related objects/tools/parts, or the like.

Data associated to the specific torque device and related to calibration of the device can include calibration intervals, scheduled calibration, last calibration, optimal torque profile, torque applied and resulting angular displacement, calibrated torque values, pass/fail criteria, or the like.

A variety of configurations of the automated calibration monitoring (ACM) device 100 in combination with the calibration device 160 (e.g., torque tester), the calibration database 170, the inventory control (IC) database 180, and the object/tool 401 subject to calibration measurement and testing will be described below.

Figure 4A:
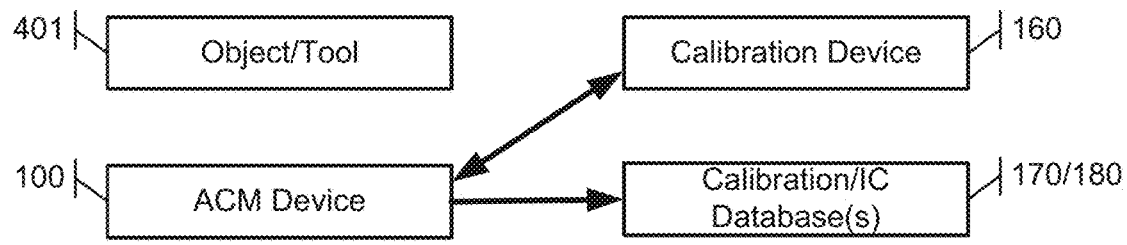
FIGS. 4A-4D show simplified functional block diagrams showing information flow involved in providing the calibration monitoring services between components of the automated calibration monitoring devices and/or systems like those shown in FIGS. 1A and 1B.

FIGS. 4A-4D show various system connection configurations that may be used in the automated calibration monitoring systems described above. In FIG. 4A, a first configuration is used in which the object/tool 401 subject to calibration measurement is not configured for electronic data transfer or communication (or the object/tool's electronic data transfer or communication functionality is not used). In this case, the calibration device 160 can be co-located with the ACM device 100 and be communicatively connected to the ACM device for communication of calibration measurements. In turn, the ACM device 100 (e.g., a tool control system toolbox 200) is communicatively connected to the networked calibration and/or inventory control databases 170/180 for information exchange purposes.

Figure 4B:
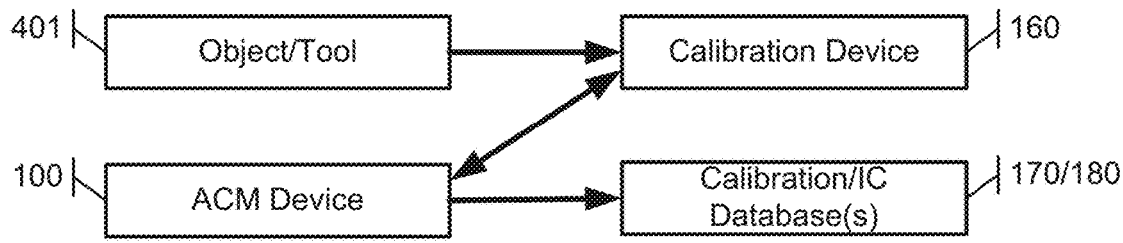

FIG. 4B shows a second configuration in which the calibrated object/tool 401 is configured for electronic data transfer and is communicatively connected to the calibration device 160 (e.g., a torque tester). The calibration device 160 is again communicatively connected to the ACM device 100. In turn, the ACM device 100 is communicatively connected to the networked calibration and/or inventory control databases 170/180 for information exchange purposes.

Figure 4C:
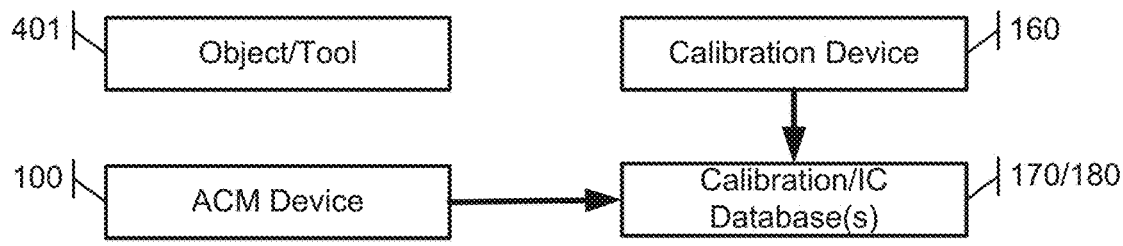

FIG. 4C shows a third configuration in which the calibrated object/tool 401 is not configured for electronic data transfer (or the calibration object/tool's electronic data transfer functionality is not used). In this case, the calibration device 160 can be located at the ACM device 100 or remote from the ACM device 100 and is communicatively connected to the networked calibration and/or inventory control databases 170/180 for information exchange purposes. The ACM device 100 and the calibration device 160 are thus both independently connected to the networked calibration and/or inventory control databases 170/180 for information exchange purposes.

Figure 4D:
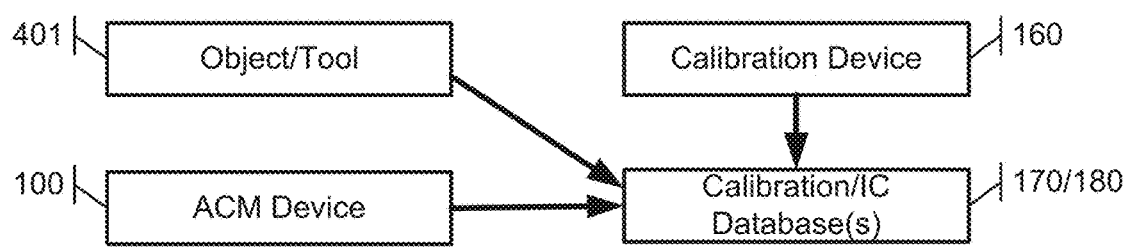

FIG. 4D shows a fourth configuration in which the calibrated object/tool 401 is configured for electronic data transfer. The calibrated object/tool 401 and the calibration device 160 can be located at the ACM device 100 or can be remote from the ACM device 100. The calibrated object/tool 401, the ACM device 100, and the calibration device 160 are all communicatively connected to the networked calibration and/or inventory control databases 170/180 for information exchange purposes.

While the inventory control system discussed in relation to FIG. 2A takes the form of a toolbox, calibrated tools including torque devices are stored in a central repository (e.g., a tool crib) in many work environments and the tools are issued from the central repository to technicians for use in disparate or remote work locations. In such environments, a calibration device 160 can be provided within a tool crib or at the point of issue (e.g., entrance and exit) of the tool crib to enable calibration measurements to be performed at the time of entrance or exit from the tool crib. When an object/tool equipped with a unique identifier is scanned to be issued from the automated tool control system (e.g., to be issued at a tool crib issue portal), the calibration monitoring system automatically identifies the object/tool and retrieves calibration data associated to the object/tool. The system also provides an alert to the user that the object/tool must have its calibration measured prior to issuance.

Calibration devices 160 such as electronic torque testers can be equipped with the capability to measure or test the calibration of tools (such as torque devices) using manually input pass/fail criteria and to display results. More advanced versions of the calibration tools can electrically transfer torque measurement data to software packages for analysis. The transfer and analysis can be done locally on the calibration device or the data can be transferred to another device (e.g., an automated calibration monitoring device) across a network. In either case, however, the calibration device did not previously have the capability to automatically identify specific objects/tools/devices and associate pass/fail criteria or test data to the system for the specific identified object/tool/device. For example, previously, the identity of the object/tool/device to be tested had to be manually input into the calibration device by a user.

In contrast, in the automated calibration monitoring system described herein, the calibration device 160 (e.g., torque tester) is configured with data processing and data storage capabilities, computing software, wired and/or wireless network communications capabilities, a user interface, and the means for automatically inputting data. The calibration device 160 may be powered by an AC power supply, by batteries, or by a combination of both batteries and/or AC power. The user interface may be an LED display, an LCD display or monitor, or other currently utilized technologies for displaying information. The data input interface for the calibration device 160 can include wired or wireless communications capabilities, keyboards, keypads, mice, RFID, optical (barcode) scanners, cameras, or the like.

Based on the functionalities described above, the automated calibration monitoring device can be used for auditing purposes. In particular, if an object/tool (e.g., a torque device) fails the calibration measurement test when it is returned to the automated calibration monitoring system, the system may retrieve from memory data indicating the work location and/or the work order that the object/tool was issued under. In such cases, the system can produce a report indicating that the object/tool failed the calibration measurement test and identifying the work location and/or the work order under which the object/tool was last issued. The report can be automatically distributed by email or text message to appropriate individuals as identified by the system administrator. For auditing purposes, the report can also indicate all work locations and/or work orders that the object/tool was issued to since the tool's last in-calibration measurement.

If the work order contains routings or information that describes the products on which the object/tool was used (e.g., a list of fasteners torqued as part of the work order), the system can also list in the report each of the products (e.g., individual fasteners) that may have been improperly worked on since the object/tool was last issued and passed a calibration measurement test. The system can also create a validation report showing all calibrated objects/tools issued against a work location or work order and their recorded calibration measurement test values and other pertinent data.

As detailed above, the automated calibration monitoring device 100 is operative to request calibration measurements (e.g., torque measurements) from a calibration device 160 and validate the calibrations status of tools or other inventory objects stored in the automated calibration monitoring device 100. The tools/objects generally have unique identifiers associated therewith and associated with tags provided on the tools/objects, and the identifiers and associated tools/objects devices are identified in inventory control and/or calibration database(s) as being tools/objects for which calibration is to be monitored. The automated calibration monitoring device 100 can thus recognize calibrated tools/objects through recognition of the unique identifiers attached to the tools/objects when the tools/objects are issued from or returned to the system. The tools/objects further have calibration data, including target calibration values, stored and associated therewith in the database(s). The automated calibration monitoring system can thus require that a calibration measurement or test be performed on a tool/object to confirm whether the calibrated tool/object is accurately in calibration prior to and/or after each use of the object. The parameters of the calibration monitoring (used to determine whether the tool is in calibration or out of calibration) can be determined by a user but are generally retrieved from the calibration database as calibration target values associated in the database with the unique identifier of the tools/objects.

The automated calibration monitoring device 100 and tool control system 200 (and software associated therewith and executed on system processor(s)) are thus programmed to compare calibration data such as torque data for a tool as obtained from the calibration measurement device (e.g., torque tester) with one or more calibration target values for the tool, such as calibration values which are associated with a unique identifier of the tool and which are stored in one or more of the inventory control and calibration database(s). Based on the comparison, the automated calibration monitoring device 100 can determine whether the tool satisfies calibration requirements set by the calibration values. If the calibration requirements are not satisfied, the automated calibration monitoring device 100 may identify the tool as being out of calibration and may issue an alert to any user seeking to issue or check-out the tool from the system 100. The automated calibration monitoring system 100 can thus allow issue and return of the calibrated tool/object if the results of the calibration measurement fall within an acceptable calibration range stored for each tool/object in the calibration database.

Upon issue of an object/tool from the automated calibration monitoring system, the automated calibration monitoring system can bar issue of the calibrated object/tool if the calibration measurement value does not meet or fall within the acceptable range of calibration values for the tool/object. For example, the system can issue audible and visual instructions to return the tool/object which failed to meet the calibration test criteria to an appropriate storage location in the device. The system can alternatively or additionally issue audible and visual instructions to transfer the tool/object which failed to meet the calibration test criteria to an appropriate location where the repair and re-calibration processes occur. As part of this process, the automated calibration monitoring system can issue status alerts to users, system administrators, calibration lab personnel, or the like when the tested tool/object fails to meet the calibration criteria pre-stored in the calibration database in order to enable the alerted parties to appropriately respond to the situation (e.g., by recalibrating the object, by flagging work orders associated with the improper calibration, or the like).

Upon return of an object/tool to the automated calibration monitoring system, the system can require the object/tool be returned to its appropriate storage location within the storage device if the calibration measurement results do not meet the acceptable calibration requirements when the object/tool is being returned to the storage device after use. Alternatively, the system can require that the object/tool be transferred to an appropriate calibration lab if the calibration measurement results do not meet the calibration requirement. Again, the automated calibration monitoring system can issue status alerts to users, system administrators, calibration lab personnel, or the like when the tested object/tool fails to meet the calibration measurement criteria pre-stored in the calibration database in order to enable the alerted parties to appropriately respond to the situation (e.g., by recalibrating the object, by flagging work orders associated with the improper calibration, or the like).

The calibration monitoring device 100 utilizes one or more of various sensing technologies to determine issue/return or presence/absence of objects from its storage. For example, the issue/return or presence/absence of objects can be sensed using one or more of imaging-based sensing technology (e.g., using cameras), RFID-based sensing technology, individual switches or sensors (e.g., contact, capacitive, inductive, weight, or other sensors), such as sensing technologies used in automated tool control (ATC) imaging toolboxes, ATC RFID lockers, and/or ATC tool crib management systems. Further details of the sensing technologies and associated sensing methodologies used in inventory control are described in U.S. Pat. No. 9,741,014, issued Aug. 22, 2017, which is hereby incorporated by reference in its entirety.

Unique identifiers, such as color coded tags, RFID tags, bar codes, etc., can be attached to inventory objects or tools including calibrated objects/tools stored in the storage container of the automated calibration monitoring system 100 and used to uniquely identify items (e.g., so as to distinguish between two items that are otherwise undistinguishable to the system's sensing technology, such as two visually identical tools being sensed using an imaging system). Examples of identification tags including combinations of parallel colored lines forming unique color sequences are discussed in relation to FIGS. 2B-2E.

Figure 5:
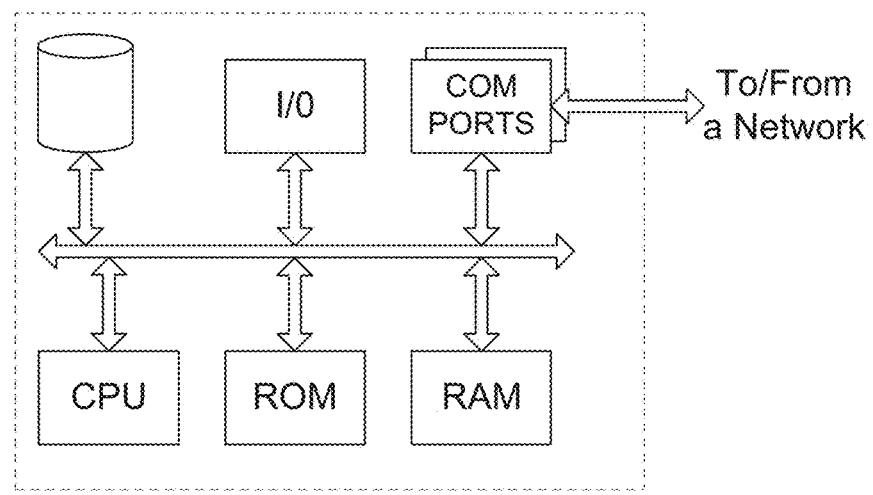
FIG. 5 is a simplified functional block diagram of a computer that may be configured as a host or server, for example, to function as the calibration server or inventory control server supporting databases in the automated calibration monitoring system of FIG. 1B.

FIG. 5 provides a functional block diagram illustrations of a general purpose computer hardware platform that may be used as a network or host computer platform to implement a server The computer platform of FIG. 5 may be used to implement a server supporting the calibration database 170 and/or the automated inventory control database 180 and the associated functionalities as described herein, and may be used to implement an inventory control server or calibration monitoring server performing one or more of the functionalities described in FIGS. 3A-3E. The computer platform of FIG. 5 may also be combined with user interface elements to implement a personal computer or other type of work station or terminal device, such as to implement computing functionalities within a calibration device 160 or object/tool 401. It is believed that those skilled in the art are familiar with the structure, programming and general operation of such computer equipment and as a result the drawings should be self-explanatory.

A server, for example that shown in FIG. 5, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. An automated calibration monitoring system comprising:
    a plurality of storage locations configured to store inventory items including a calibrated inventory item;
    a database storing information on inventory items, including the calibrated inventory item, associated with the automated calibration monitoring system and configured for storage in the plurality of storage locations of the automated calibration monitoring system, wherein the database further stores a calibration parameter value for the calibrated inventory item; and
    a processor configured to, upon the calibrated inventory item being issued from or returned to the automated calibration monitoring system:
    compare a calibration measurement of the calibrated inventory item with the calibration parameter value for the calibrated inventory item, wherein the processor selectively authorizes the issue or return of the calibrated inventory item according to a result of the comparison; and
    generate a report indicative of whether the calibration measurement corresponds to at least one of: passing or failing a calibration test, a work location, or a work order.

2. The automated calibration monitoring system of claim 1, further comprising:
    a calibration measurement device communicatively connected to the processor and configured to perform a calibration of the calibrated inventory item to obtain the calibration measurement,
    wherein the calibration measurement device communicates the obtained calibration to the processor.

3. The automated calibration monitoring system of claim 2, wherein the calibrated inventory item is a torque wrench, and the calibration measurement device is a torque tester.

4. The automated calibration monitoring system of claim 2, wherein the processor is further configured to:

upon the calibrated inventory item being issued from or returned to the automated calibration monitoring system, transmit a calibration target value for the calibrated inventory item to the calibration measurement device, and wherein the processor receives the obtained calibration from the calibration measurement device after the transmission of the calibration target value.

5. The automated calibration monitoring system of claim 1, wherein:

the calibration parameter value stored in the database includes an acceptable range of calibration parameter values stored in the database, and the processor selectively authorizes the issue or return of the calibrated inventory item when the calibration measurement is within the acceptable range of calibration parameter values.

6. The automated calibration monitoring system of claim 1, further comprising:

a sensing device configured to sense information used by the processor to determine the presence or absence of inventory items in the plurality of storage locations, wherein the processor is configured to determine presence of the calibrated inventory item in a storage location of the plurality of storage locations based on the information sensed by the sensing device.

7. The automated calibration monitoring system of claim 6, wherein:

the sensing device includes an image sensor configured to capture images of the plurality of storage locations of the automated calibration monitoring system, and the processor is configured to determine presence of the calibrated inventory item by determining whether the calibrated inventory item is present in an image captured by the image sensor.

8. The automated calibration monitoring system of claim 6, wherein:

each inventory item associated with the automated calibration monitoring system has a tag uniquely identifying the inventory item, and the processor is configured to uniquely identify an inventory item present in a storage location of the plurality of storage locations by recognizing the tag uniquely identifying the inventory item in the information sensed by the sensing device.

9. The automated calibration monitoring system of claim 8, wherein:

each inventory item associated with the automated calibration monitoring system has a radio frequency identification (RFID) tag uniquely identifying the inventory item, and the automated calibration monitoring system further comprises an RFID sensor configured to read RFID tags of inventory items located within the plurality of storage locations.

10. The automated calibration monitoring system of claim 1, wherein the database stores records of work orders associated with previous issuances of the calibrated inventory item, and the database stores records of previous calibration measurements of the calibrated inventory item.

11. The automated calibration monitoring system of claim 10, wherein the processor is configured to:

upon determining that the compared calibration measurement of the calibrated inventory item is inconsistent with the calibration parameter value for the calibrated inventory item, retrieve from the database all records of work orders associated with the calibrated inventory item and corresponding to issuances of the calibrated inventory item following the last stored record of a previous calibration measurement of the calibrated inventory item.

12. A method for automated monitoring of calibration of inventory items in an automated calibration monitoring system comprising:

identifying, using a sensor of the automated calibration monitoring system configured to sense presence or absence of inventory items, a calibrated inventory item subject to monitoring of calibration;

retrieving, from a database communicatively connected to the automated calibration monitoring system and storing calibration parameter values for each of a plurality of inventory items, a calibration parameter value for the identified calibrated inventory item;

determining a calibration status of the calibrated identified inventory item based on a comparison of a calibration measurement of the calibrated inventory item with the retrieved calibration parameter value for the calibrated inventory item, wherein the automated calibration monitoring system selectively authorizes the issue or return of the calibrated inventory item from a storage location of the automated calibration monitoring system according to a result of the determination; and generating a report indicative of whether the calibration status corresponds to at least one of: passing or failing a calibration test, a work location, or a work order.

13. The method of claim 12, further comprising:

prior to the determining, receiving, from a calibration measurement device communicatively connected to the automated calibration monitoring system and configured to perform the calibration measurement of the calibrated inventory item, the calibration measurement of the calibrated inventory item.

14. The method of claim 13, wherein the calibrated inventory item is a torque wrench, and the calibration measurement device is a torque tester.

15. The method of claim 13, further comprising:

transmitting a calibration target value for the calibrated inventory item to the calibration measurement device, and wherein the automated calibration monitoring system receives the calibration measurement from the calibration measurement device after the transmission of the calibration target value.

16. The method of claim 12, wherein:

each inventory item associated with the automated calibration monitoring system has a tag uniquely identifying the inventory item, and the automated calibration monitoring system is configured to uniquely identify the calibrated inventory item by recognizing the tag uniquely identifying the calibrated inventory item in information sensed by the sensor.

17. The method of claim 16, wherein:

each inventory item associated with the automated calibration monitoring system has a visible tag uniquely identifying the inventory item, and the automated calibration monitoring system identifies the calibrated inventory item by identifying the visible tag of the calibrated inventory item in an image captured by an image sensing device of the automated calibration monitoring system.

18. The method of claim 16, wherein:
each inventory item associated with the automated calibration monitoring system has a radio frequency identification (RFID) tag uniquely identifying the inventory item, and
the automated calibration monitoring system identifies the calibrated inventory item by reading the RFID tag of the calibrated inventory item.

\* \* \* \* \*